United States Patent
Bigelow et al.

(10) Patent No.: US 6,874,434 B1
(45) Date of Patent: Apr. 5, 2005

(54) BIOMASS WASTE DISPOSAL METHOD AND APPARATUS

(75) Inventors: Robert T. Bigelow, Las Vegas, NV (US); Martin S. Piltch, Los Alamos, NM (US)

(73) Assignee: Bigelow Aerospace, North Las Vegas, NV (US)

( * ) Notice: Subject to any disclaimer, the term of this patent is extended or adjusted under 35 U.S.C. 154(b) by 0 days.

(21) Appl. No.: 10/418,847

(22) Filed: Apr. 18, 2003

(51) Int. Cl.[7] .............................. F23K 1/00; F23G 5/02
(52) U.S. Cl. ...................................... 110/222; 110/218
(58) Field of Search ...................... 4/320, 319, 111.4, 4/111.5; 110/165 R, 342, 346, 218, 219, 110/222

(56) References Cited

U.S. PATENT DOCUMENTS

| | | | |
|---|---|---|---|
| 2,678,450 A * | 5/1954 | Simpson et al. ............... | 4/312 |
| 3,752,090 A * | 8/1973 | Frankel et al. ............... | 4/111.3 |
| 3,816,857 A * | 6/1974 | West, Jr. ...................... | 4/111.3 |
| 3,817,193 A * | 6/1974 | Frankel et al. ............... | 4/111.4 |
| 3,855,645 A * | 12/1974 | West, Jr. ...................... | 4/111.3 |
| 3,864,258 A * | 2/1975 | Richardson et al. .......... | 210/85 |
| 3,956,126 A * | 5/1976 | Streebin et al. ............. | 210/104 |
| 4,118,315 A | 10/1978 | Fletcher et al. ........... | 210/23 F |
| 4,148,103 A * | 4/1979 | Nishioka ...................... | 4/111.1 |
| 4,162,656 A * | 7/1979 | Dallen et al. ................ | 110/221 |
| 4,901,652 A * | 2/1990 | Pressnall et al. ............. | 110/259 |
| 4,937,891 A | 7/1990 | Thornton, Jr. et al. ...... | 4/209 R |
| 4,942,632 A | 7/1990 | Thornton, Jr. et al. .......... | 4/661 |
| 5,005,457 A | 4/1991 | Thornton, Jr. et al. ........ | 83/206 |
| 5,228,984 A | 7/1993 | Lindstrom ................... | 210/151 |
| 5,666,891 A * | 9/1997 | Titus et al. ................. | 110/250 |
| 5,796,111 A | 8/1998 | Mahoney ................. | 250/492.2 |
| 6,033,484 A | 3/2000 | Mahoney ........................ | 134/1 |
| 6,495,846 B1 | 12/2002 | Vaughan ................... | 250/506.1 |

* cited by examiner

Primary Examiner—Kenneth Rinehart
(74) Attorney, Agent, or Firm—Franklin E. Gibbs

(57) ABSTRACT

An apparatus is disclosed for disposing of biomass material. The apparatus may include a receiving chamber for receiving a biomass, a maceration chamber for macerating the biomass received from the receiving chamber and producing macerated biomass, and an incinerating chamber incinerating the macerated biomass into a incinerated biomass. The apparatus is particularly suited to operate in remote or zero-gravity environments.

16 Claims, 1 Drawing Sheet

BIOMASS WASTE DISPOSAL METHOD AND APPARATUS

BACKGROUND

1. Field of the Disclosure

Figure 1:
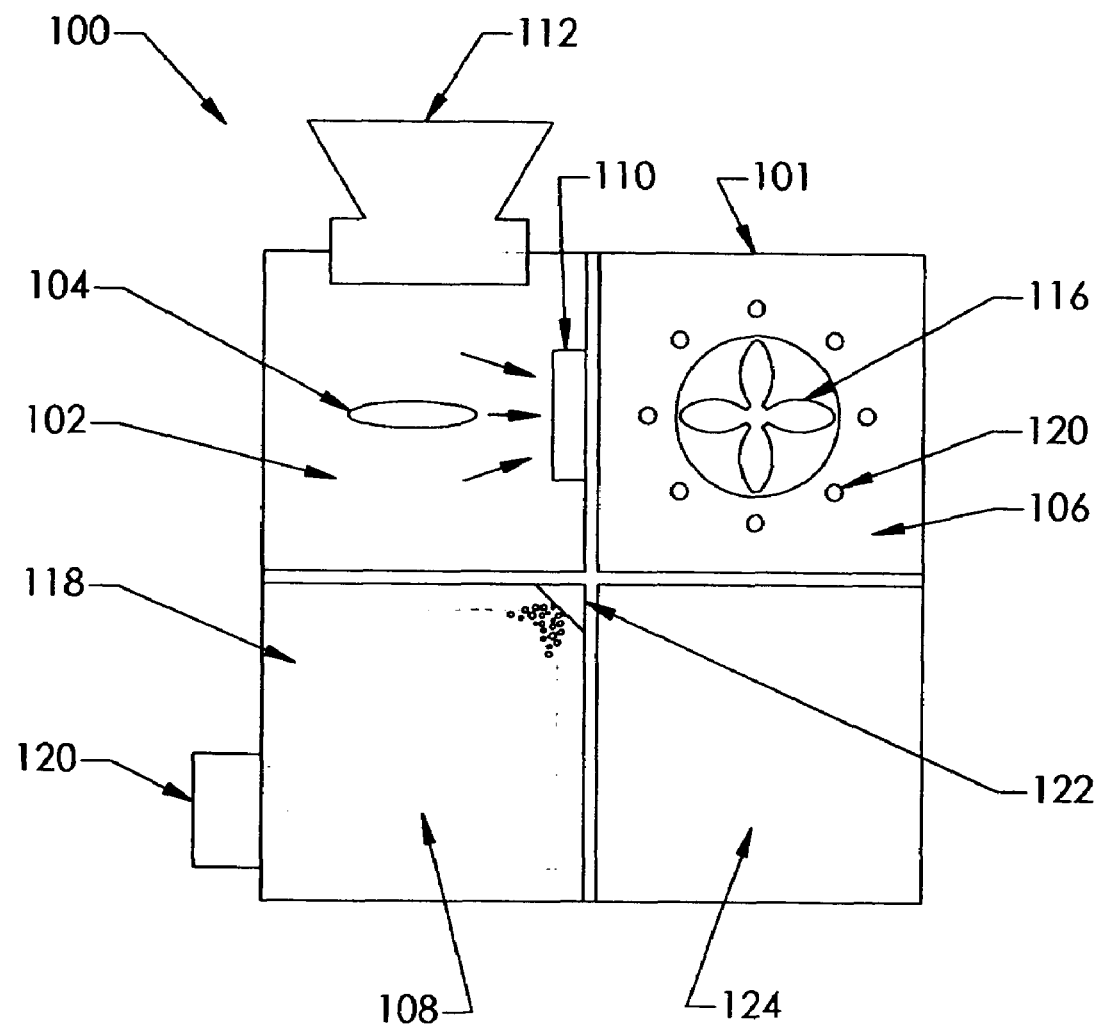

The present invention relates to a waste disposal system, and in particular, to a waste disposal system operable in an environment where it is disadvantageous to store waste and desired to maintain a pristine environment.

2. The Prior Art

Waste disposal in space or in remote locations is challenging. For example, in space, human and other waste may no longer be vented overboard as even minor debris such as paint chips may impact spacecraft, causing serious damage. Except for gases, waste must be stored on board for the duration of a mission and brought back to Earth and disposed terrestrially.

Furthermore, storage methods of the prior art require that organic waste, such as human waste, be sealed and stored on board a spacecraft leading to the possibility of undesirable leakage and the spreading of disease.

BRIEF DESCRIPTION OF THE DRAWING FIGURES

FIG. 1 is a functional cutaway diagram of one aspect of a biomass disposal unit configured in accordance with the teachings of this disclosure.

DETAILED DESCRIPTION

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

Referring now to FIG. 1, a functional cutaway diagram is shown of one embodiment of a biomass disposal unit 100 configured in accordance with the teachings of this disclosure. In one disclosed embodiment, the biomass disposal unit 100 may incorporate distinct functional chambers, with each constituent chamber performing one or more acts on the biomass to be disposed.

In the embodiment shown in FIG. 1, the biomass disposal unit 100 is shown incorporating three separate chambers. A first chamber 102 is provided for receiving a biomass 104, a second chamber 106 is provided for macerating the biomass 104, and a third chamber 108 is provided for incinerating the biomass 104.

The biomass disposal unit 100 may be enclosed in a housing 101. The housing may be manufactured of any material; however depending on the environment in which it will be used different considerations may be taken into account.

It is contemplated that the biomass disposal unit of this disclosure may be deployed in a variety of environments. In one embodiment, the unit may be deployed in a zero-gravity environment, such as in a spacecraft. Additionally, the unit may be deployed in a low-gravity extraterrestrial environment, such as in a space station with low-gravity generation capability, or on the surface of the Moon or Mars.

Additionally, the unit may be deployed in a remote location where waste disposal options are limited, such as on long-term missions in the polar regions of the Earth, or on underwater expeditions.

The housing 101 material may also be chosen to satisfy certain physical characteristics. For example, on a spaceship weight needs to be considered in the construction of the present invention. Further, the intense heat from the incinerating of the biomass must be considered.

It is contemplated that a wide variety of objects or material may be disposed using the teachings of this disclosure. For example, biological human waste, waste such as paper or plastics, or any other material that may be macerated and incinerated using the teachings of this disclosure and may be so disposed. Such material will hereinafter be collectively referred as a biomass.

It is to be understood that the arrangement of the functional chambers illustrated in FIG. 1 is illustrative only and is not the only arrangement contemplated. For example, the biomass 104 may be disposed by being transported sequentially through each of the constituent functional chambers, or, the chambers may be configured to perform more than one function, resulting in less chambers to move the biomass between. In a low- or zero-gravity environment, the biomass may be transported through the system by using a system of vacuum chambers and tunnels.

Alternatively, the biomass 104 may remain stationary, with the functional chambers being rotated with respect to the biomass in a circular "Lazy Susan"-type arrangement; with each chamber sequentially processing the biomass 104 in turn. In this arrangement, the biomass may be positioned in the center of the system, with the chambers being arrangened in a circular fashion about the biomass. Furthermore, the biomass may remian in a crucible throughout the process.

Each of the constituent chambers will now be disclosed in greater detail.

The receiving chamber 102 may be comprised of a chamber for receiving and retaining the biomass 104. This feature is especially useful in a zero-gravity environment, where the first chamber 102 may contain suction or airflow equipment 110 to direct and retain the biomass 104. The equipment 110 may also be configured to transport the biomass 104 to the next chamber.

It is contemplated that the biomass disposal unit 100 may be especially suited to dispose of human waste. Accordingly, when so used, a seat 112 may be provided. The seat 112 may be configured to form a conformal seal with the buttocks of a user to ensure that waste is directed into the unit.

It is contemplated that the biomass disposal unit 100, and in particular the receiving chamber 102, may employ certain safety features to safeguard the user and their environment from damage or contamination. Such features may include fail-safe mechanisms to ensure that particular functional features are inoperable until the biomass reaches a safe desired position. It is contemplated means known in the art may be employed to biologically seal the biomass within the unit. Additionally, the internal operational components may be safeguarded from the user using means known in the art such as mechanical and/or electrical interlocks. In a further embodiment a removable barrier may be placed in between each functional chamber to provide a safety barrier.

The maceration chamber 106 is preferably configured to macerate the biomass 104 in preparation for incineration. As used herein, maceration indicates increasing the granularity of the biomass, thereby creating a larger surface area, resulting in a more efficient and complete incineration.

In a preferred embodiment, a blade array 116 may be provided for maceration, comprising any type of blade that may macerate the biomass into a state suitable for incineration.

To achieve more complete maceration in a zero-gravity environment, a vacuum may be provided and deployed in the second chamber 106 near the blade array 116. A predetermined pressure gradient within the chamber may be created by disposing a series of air holes 120 around the base of the blade array 116, creating a patterned vacuum and resulting air flow to direct the biomass into contact with the blade array. By disposing the air holes 120 about the perimeter of the blade array 116, clogging of the air holes 120 may be prevented. It is contemplated that screens or other porous, breathable protection may be deployed over the air holes 120.

The incineration chamber 108 is preferably configured to subject the macerated biomass 104 to very high temperatures. To facilitate a controlled incineration, a crucible 118 may be provided. In this embodiment, the biomass 104 may be incinerated while housed within the crucible by applying heat directly to the exterior of the crucible, thereby raising the internal temperature to a suitable level for incineration of the biomass 104. In such an embodiment, the incineration chamber 108 and crucible may fabricated from a metal capable of enduring high temperatures, such as titanium. Additionally, the crucible may provide for a sealed incineration process, with any exhaust gases generated as a result of combustion, such as water vapor or other gases, being vented to a reservoir 120.

In a preferred embodiment, the heat source 122 may be any heat source capable of rendering the biomass into a powdered state. Such heat sources may be capable of subjecting the biomass to temperatures as high as 5,000° F. The heat sources may be chosen based on power limitations inherent in the desired environment. Additionally, heat sources may be chosen with consideration for the manner in which heat is generated and the resulting components of any exhaust.

In yet a further preferred embodiment, the heat source may comprise a plasma torch. A plasma torch generates the intense heat needed for the sub-stoichiometric dissociation of waste materials. The torch can generate temperatures up to 21,000° F. (11,650° C.) to maintain an operating temperature (by way of example) of 3,000° F. (1,650° C.) throughout the processing chamber to completely pyrolyze all organic compounds and vitrify the inorganics.

As will be appreciated by those of ordinary skill in the art, the use of the plasma torch provides at least two distinct advantages: First, it decomposes all organic materials, and second, it turns all inorganic material into glass, thereby allowing the use of a single disposal machine for the disposing of both types of material.

Additionally, the incinerated materials may later be separated, with the organic material being used as a fertilizing material, and the inorganic material stored for later disposal.

Plasma energy offers distinct advantages over conventional incinerator systems used for the thermal destruction of waste: massless heat, high operating temperatures, a controlled processing atmosphere, and rapid shutdown capabilities. The low mass characteristic of plasma arc torch heating reduces the required size of the unit, and only a small amount of gas is required to generate and maintain the plasma arc to heat the incineration chamber. Feedback from gas and temperature sensors in the processing chamber may used to regulate waste feed rate, temperature and reactivity of the atmosphere. The controlled atmosphere assures reliable and predictable physical and chemical changes.

Use of the crucible may be advantageous when a plasma torch is used as the heat source, as the crucible may be used to seal the heat source from the biomass exhaust fumes, thereby preventing contamination of the plasma torch and allowing the gases used by the torch to remain uncontaminated and reusable.

The incinerated remains of the biomass 104 may then be removed.

It is contemplated that a treatment chamber 124 may be provided to prepare the incinerated biomass for disposal. In one embodiment, the treatment chamber may be configured to cool the biomass prior to removal from the unit. Additionally, desired organic components of the incinerated biomass may be prepared for further use, such as for fertilizer and, the vitrified inorganic compounds are sifted out and stored for disposal.

Furthermore, the organic component of the incinerated biomass may be recovered and prepared for use in a hydroponics environment, for example, as a fertilizing agent.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An apparatus for disposing biomass material comprising:
   receiving chamber means for receiving a biomass;
   maceration chamber means coupled to receiving chamber means, maceration chamber means including a blade array containing a series of air holes disposed around a base of said blade array for creating a patterned vacuum and directing said biomass into contact with said blade array for macerating said biomass received from said receiving chamber means; and
   incinerating chamber means coupled to maceration chamber means, incinerating chamber means for incinerating said macerated biomass.

2. The apparatus of claim 1, wherein said receiving chamber means further comprises airflow equipment coupled to said receiving chamber means, the airflow equipment directing and retaining said biomass within said receiving chamber.

3. The apparatus of claim 1, wherein said receiving chamber means is further configured to transport said biomass to said maceration chamber.

4. The apparatus of claim 1, wherein said maceration chamber means further comprises a vacuum deployed proximate to said blade array.

5. The apparatus of claim 1, wherein said incineration chamber means further comprises a plasma torch coupled to the incineration chamber means.

6. An apparatus for disposing biomass material comprising:
   a receiving chamber for receiving a biomass;
   a maceration chamber coupled to the receiving chamber;
   a blade array disposed within the maceration chamber and the blade containing a series of air holes disposed around a base of said blade array for creating a patterned vacuum, thereby directing said biomass into contact with said blade array for macerating said biomass received from said receiving chamber; and
   an incinerating chamber coupled to said maceration chamber, the incinerating chamber incinerating said macerated biomass.

7. The apparatus of claim 6, wherein said receiving chamber further comprises airflow equipment, said airflow equipment coupled with the receiving chamber and the airflow equipment directing and retaining said biomass within said receiving chamber.

8. The apparatus of claim 6, wherein said receiving chamber is further configured to transport said biomass to said maceration chamber.

9. The apparatus of claim 6, wherein said receiving chamber further comprises a seat coupled to the receiving chamber and the receiving chamber receiving human waste.

10. The apparatus of claim 9, wherein said seat is further configured to form a conformal seal with the buttocks of a user.

11. The apparatus of claim 6, wherein said maceration chamber further comprises a vacuum deployed proximate to said blade array.

12. The apparatus of claim 6, wherein said incineration chamber further comprises a crucible coupled to the incineration chamber.

13. The apparatus of claim 12, wherein said biomass is incinerated while housed within said crucible.

14. The apparatus of claim 6, wherein said incineration chamber further comprises a plasma torch and the plasma torch is coupled to the incineration chamber.

15. The apparatus of claim 6, further comprising a treatment chamber coupled to the incineration chamber, the treatment chamber preparing said incinerated biomass for disposal.

16. The apparatus of claim 15, wherein said treatment chamber is configured to cool said incinerated biomass prior to removal.

* * * * *